(12) United States Patent
Ford

(10) Patent No.: US 6,830,265 B2
(45) Date of Patent: Dec. 14, 2004

(54) APPARATUS FOR ACTUATING A FLAP FOR THE VENTING OF INFLATION GASES

(75) Inventor: Brian Ford, Mt. Clemens, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/414,101

(22) Filed: Apr. 16, 2003

(65) Prior Publication Data

US 2004/0155443 A1 Aug. 12, 2004

Related U.S. Application Data

(63) Continuation-in-part of application No. 10/359,256, filed on Feb. 6, 2003.

(51) Int. Cl.⁷ .............................................. B60R 21/30
(52) U.S. Cl. ..................................................... 280/739
(58) Field of Search ............................... 280/739, 740, 280/741, 742

(56) References Cited

U.S. PATENT DOCUMENTS

| 5,853,192 | A | | 12/1998 | Sikorski et al. | |
| 6,039,346 | A | * | 3/2000 | Ryan et al. | 280/736 |
| 6,158,770 | A | * | 12/2000 | Ryan et al. | 280/736 |
| 6,161,866 | A | * | 12/2000 | Ryan et al. | 280/736 |
| 6,213,502 | B1 | * | 4/2001 | Ryan et al. | 280/736 |
| 6,409,213 | B2 | * | 6/2002 | Webber et al. | 280/739 |
| 6,439,603 | B2 | * | 8/2002 | Damman et al. | 280/736 |
| 6,540,257 | B2 | | 4/2003 | Magoteaux | 280/739 |
| 6,550,807 | B1 | * | 4/2003 | Faigle et al. | 280/739 |
| 6,669,232 | B2 | * | 12/2003 | Specht | 280/736 |
| 2001/0035638 | A1 | | 11/2001 | Kogler et al. | |
| 2001/0038201 | A1 | | 11/2001 | Ryan | |
| 2002/0005142 | A1 | | 1/2002 | Demarquilly et al. | |
| 2002/0043790 | A1 | | 4/2002 | Lynch et al. | |
| 2003/0025309 | A1 | | 2/2003 | Schenck et al. | 280/735 |
| 2003/0025312 | A1 | | 2/2003 | Amamori | 280/739 |

FOREIGN PATENT DOCUMENTS

DE    199 52 967 C    2/2001

\* cited by examiner

Primary Examiner—Faye M. Fleming
(74) Attorney, Agent, or Firm—Lonnie Drayer

(57) ABSTRACT

An airbag module comprises an airbag inflatable through an opening in the airbag. An airbag inflator provides an inflation gas into the opening in the airbag. A flap has a first position permitting gas to flow to the opening in the airbag and a second position deflecting inflation gas away fro the opening in the airbag. A propellant discharges into a discharge space moving the flap between the first position to the second position. A hood at least partially covers the discharge space.

12 Claims, 7 Drawing Sheets

APPARATUS FOR ACTUATING A FLAP FOR THE VENTING OF INFLATION GASES

This patent application is a continuation-in-part of U.S. Nonprovisional patent application Ser. No. 10/359,256 filed on Feb. 6, 2003 and claims priority therefrom.

BACKGROUND OF THE INVENTION

This invention relates to an airbag module and actuator for selectively diverting inflation gases away from the interior of an airbag.

Airbag modules comprise an airbag and an airbag inflator. When triggered by a crash detection system, the airbag inflator rapidly provides gas to inflate the airbag. The inflated airbag then serves as a cushion against injury for a vehicle occupant.

The location of the vehicle occupant with respect to the airbag may affect the effectiveness of the airbag as a cushion. If the vehicle occupant is too close to the airbag, full inflation of the airbag may result in less than optimal cushioning of any impact. Accordingly, it is desirable to inflate the airbag to less than full capacity when the vehicle occupant is too close to the airbag.

Systems exist that detect the location of the vehicle occupant. When these systems sense that the vehicle occupant is too close to the airbag, they inflate the airbag to less than full capacity. A dual-stage inflator serves to inflate the airbag in this way. The inflator's first stage partially inflates the airbag, while the second stage, if triggered, fills the airbag to a maximum level.

However, a dual-stage inflator is generally more expensive than a single-stage inflator. It would be desirable to be able to provide a virtually infinite variety of inflation levels. As an alternative to a dual-stage inflator, the present invention provides an airbag module that vents inflation gas away from the airbag when the airbag has reached an appropriate inflation level.

The airbag module of the present invention has a flap that moves from an open position that permits inflation gas to inflate the airbag to a closed position in which the inflation gas is deflected away from the opening in the airbag. In this way, the airbag module permits a greater variety of inflation levels for the airbag without adding significant cost to the manufacture of the airbag module. An actuator moves the flap from an open position to a closed position when signaled by a control unit that the airbag has reached an appropriate inflation level.

The actuator comprises a propellant that is ignited when the actuator is signaled to do so. Upon ignition the propellant generates a gas that rapidly expands to generate a force that moves the flap from the open position to the closed position. However, when ignited the propellant may emit a flash of light and discharge residual particles into the passenger compartment. While this light and these particles are by no means dangerous, during a vehicle crash they may alarm a vehicle occupant.

A need therefore exists for an airbag module and actuator that suppresses these undesirable effects.

SUMMARY OF THE INVENTION

Like existing airbag modules, the airbag module of the present invention comprises an airbag inflatable through an opening in the airbag. An inflator generates an inflation gas that passes through the opening in the airbag during deployment. Unlike known systems, the invention uses a flap that opens and closes the opening in the airbag. Typically, the flap is held in the open position to permit inflation gas to pass through the airbag during airbag deployment. When the airbag has reached an appropriate inflation level, a propellant discharges and moves the flap between the open position to the closed position. To prevent both light and residual particles from escaping into the passenger compartment, a hood covers the space where the propellant discharges.

The hood may comprise a hollow body that surrounds the discharge space. The propellant may be located in hollow body. By surrounding the area of propellant discharge, the hollow body shields the passenger compartment from light and particles generated by the propellant.

In addition, a piston may slide within the hollow body to increase the force of the propellant and even collide with the flap to close the opening in the airbag. The piston may have two positions: an actuated position following discharge and an unactuated position prior to discharge. In the unactuated position, the piston protrudes very little, if at all, out of the hollow body. On the other hand, in the actuated position, the piston extends from this position to actually contact the flap and thereby impart the momentum of the piston, and the pressure of the expanding gas to move the flap from the open position to the closed position.

The hollow body may have two pieces, an upper housing and a lower housing, and may further have a retaining lip to keep the piston from launching out of the hollow body completely. Pressure build-up within the hollow body may be significant in comparison to the scale of the piston and hollow body. Accordingly, a hole may vent inflation gas out of the hollow body to relieve this pressure build-up. The hole may be located on the piston.

The propellant may have a housing as well. The housing may be fitted with electrical contacts that ignite the propellant when signaled. To ignite the propellant, current is passed through these contacts from a controller.

The airbag actuator may accordingly have a propellant stored in a propellant housing. The actuator has a hollow body that receives the propellant and propellant housing in one end and receives a piston in the other end. Light and particles from the propellant reaction are then largely contained within the hollow body between the propellant housing and the piston. A hole in the piston reduces pressure build-up within the hollow body without allowing significant amounts of light and particles to escape during the reaction.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
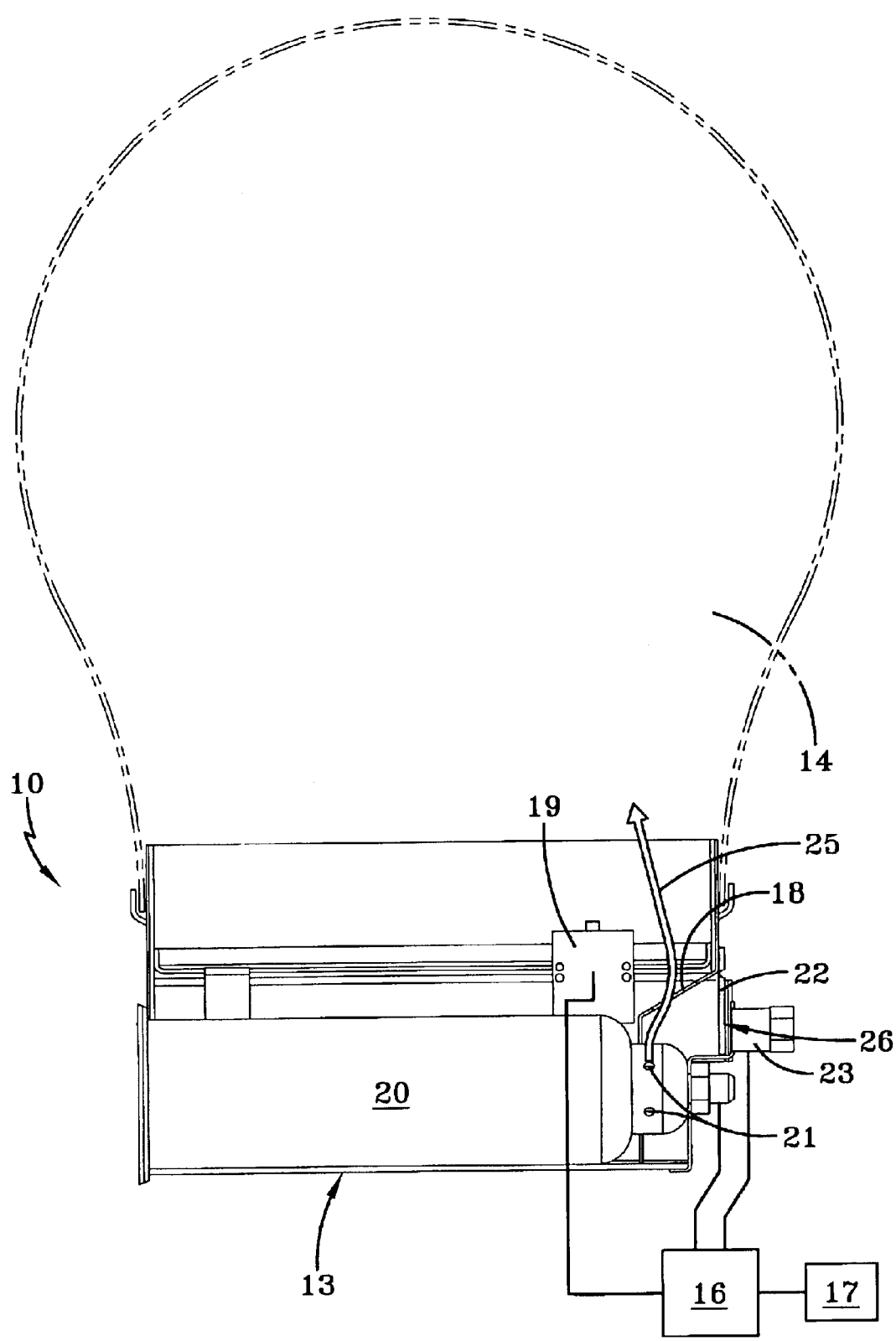
FIG. 1 illustrates airbag module with airbag, inflator, flap and actuator with the flap in an open position.
Figure 2:
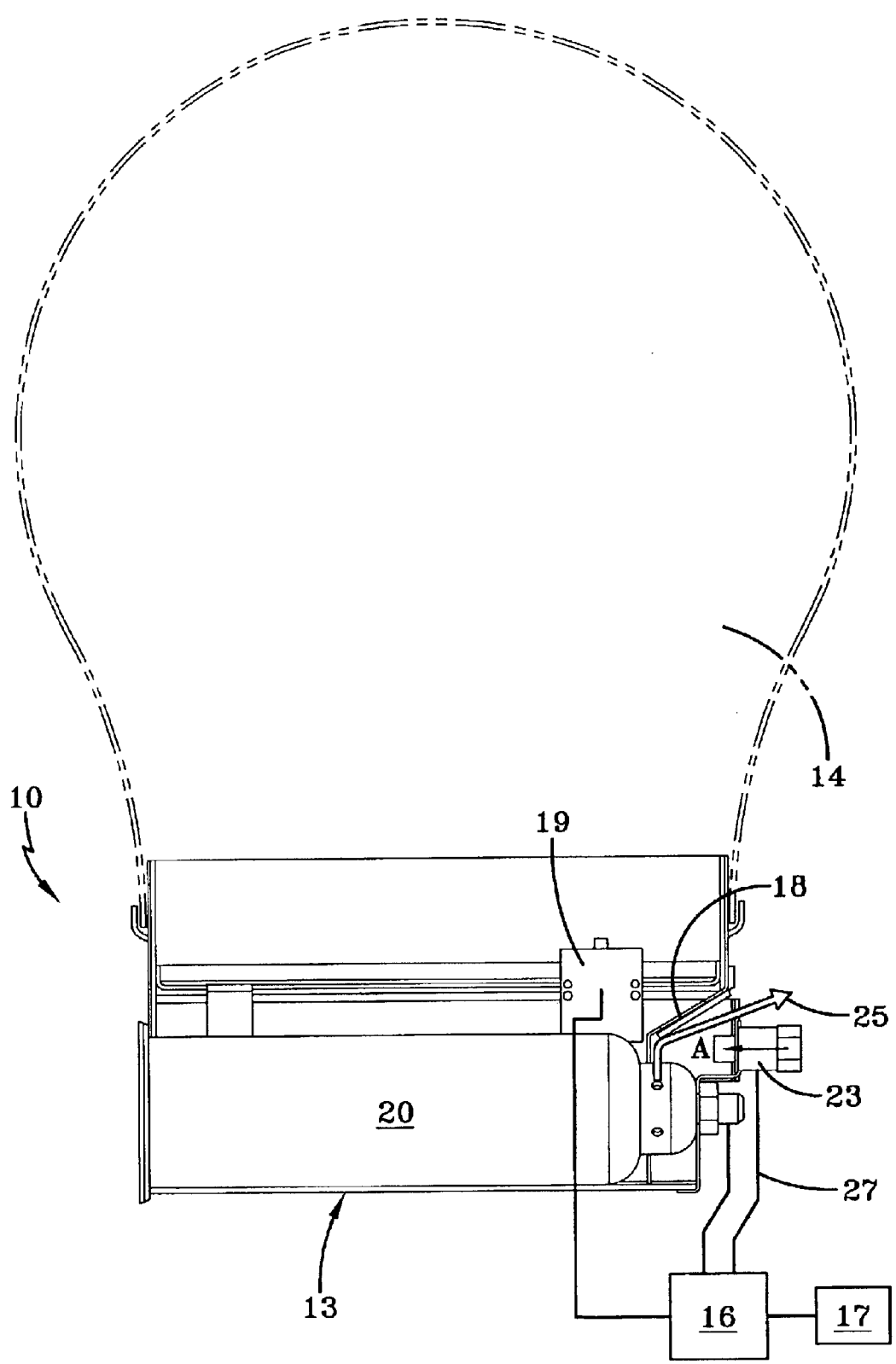
FIG. 2 illustrates airbag module of FIG. 1 with the flap in a closed position.

FIG. 1 shows an airbag module 10 according to the present invention. The airbag module comprises an airbag 14 with an opening in the airbag 18 and an airbag inflator 20. The airbag inflator 20 and the airbag 14 are attached to an airbag housing 13. A crash sensor 17 communicates with a control unit 16, which instructs the airbag inflator 20 to generate inflation gas 25 and deploy the airbag 14 if the crash sensor 17 relays crash detection data that indicates a crash of a predetermined severity. During airbag deployment, the airbag inflator 20 inflates the airbag 14 with inflation gas 25 produced by a chemical or other physical reaction. The airbag inflator 20 has ports 21 that supply inflation gas 25 into the airbag 14 through the opening in the airbag 18. As the airbag 14 inflates, a vehicle occupant position sensor 19 determines the position of a vehicle occupant, such as a passenger, relative to the airbag 14 and communicates this signal to the control unit 16. If the airbag 14 is under-inflated based on the position of the vehicle occupant, a flap 22 remains in first position 26 (open position), permitting inflation gas 25 to continue to flow through the opening in the airbag 18 into the airbag 14.

When the appropriate inflation level for the airbag 14 is reached based on the position of the vehicle occupant, the control unit 16 instructs an actuator 23 to ignite a propellant 34. The propellant 34 ignites and rapidly transforms into an expanding gas that causes the flap 22 to move in the direction of second position 30 to thereby cover the opening in the airbag 18 and deflect further inflation gas 25 away from airbag 14.

Figure 3:
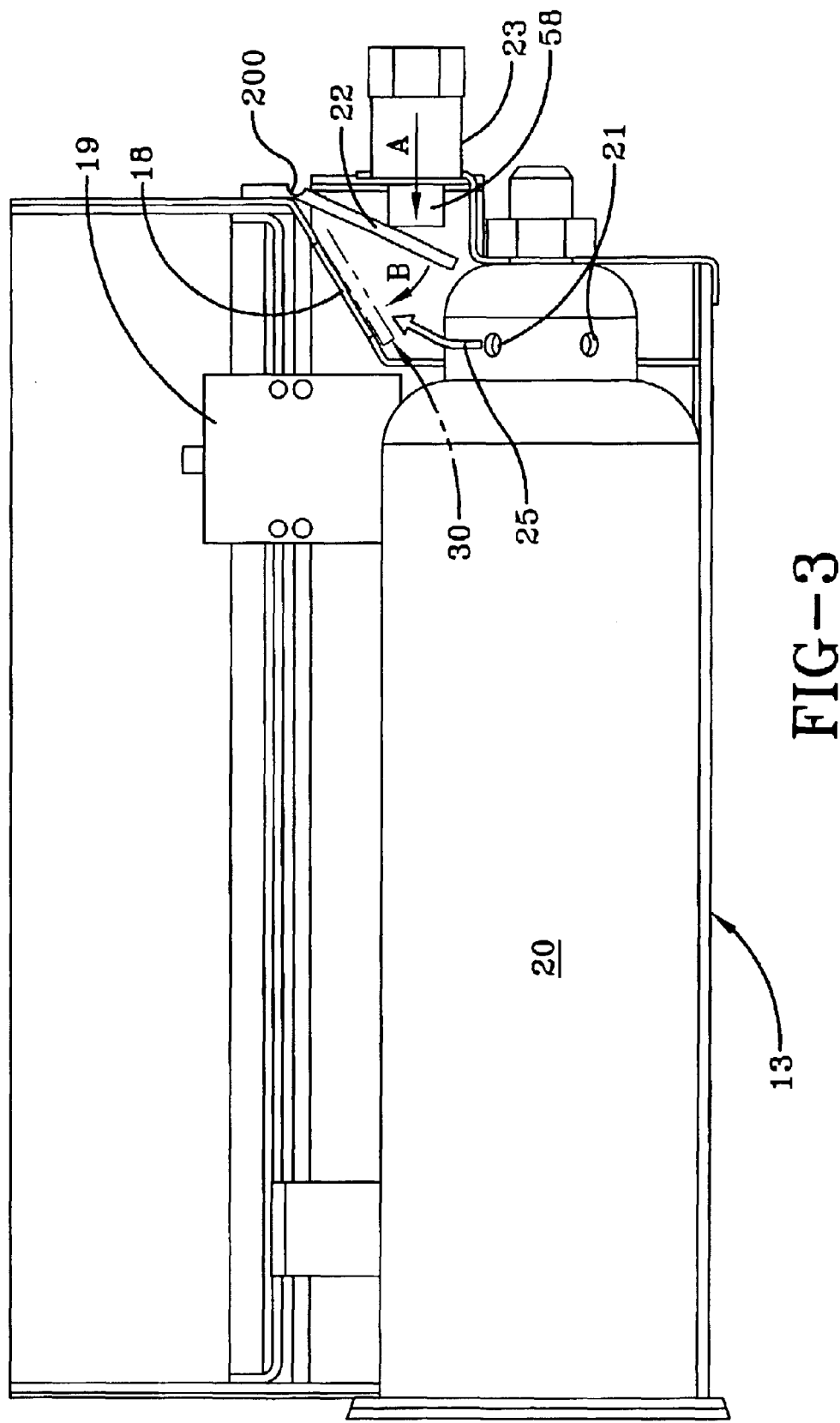
FIG. 3 is a close up of the airbag module of FIGS. 1 and 2, highlighting actuator with piston in contact with the flap.

FIG. 3 illustrates how the actuator 23 causes the flap 22 to move toward a second position 30. Specifically, when the airbag 14 has reached an appropriate inflation level, the control unit 16 instructs the actuator 23 to propel a piston 58 in a direction indicted by an arrow A towards the flap 22. The piston 58 collides with the flap 22 imparting momentum to the flap 22 forcing it to bend at a groove 200 so that the bottom portion 202 of the flap can swing in the direction indicated by an arrow B towards a second position 30. Inflation gas 25 from the ports 21 of the inflator 20 may assist the flap 22 in moving toward the second position 30 as momentum of the flap 22 in the direction indicated by the arrow B carries the flap 22 into the path of the inflation gas 25.

Figure 4:
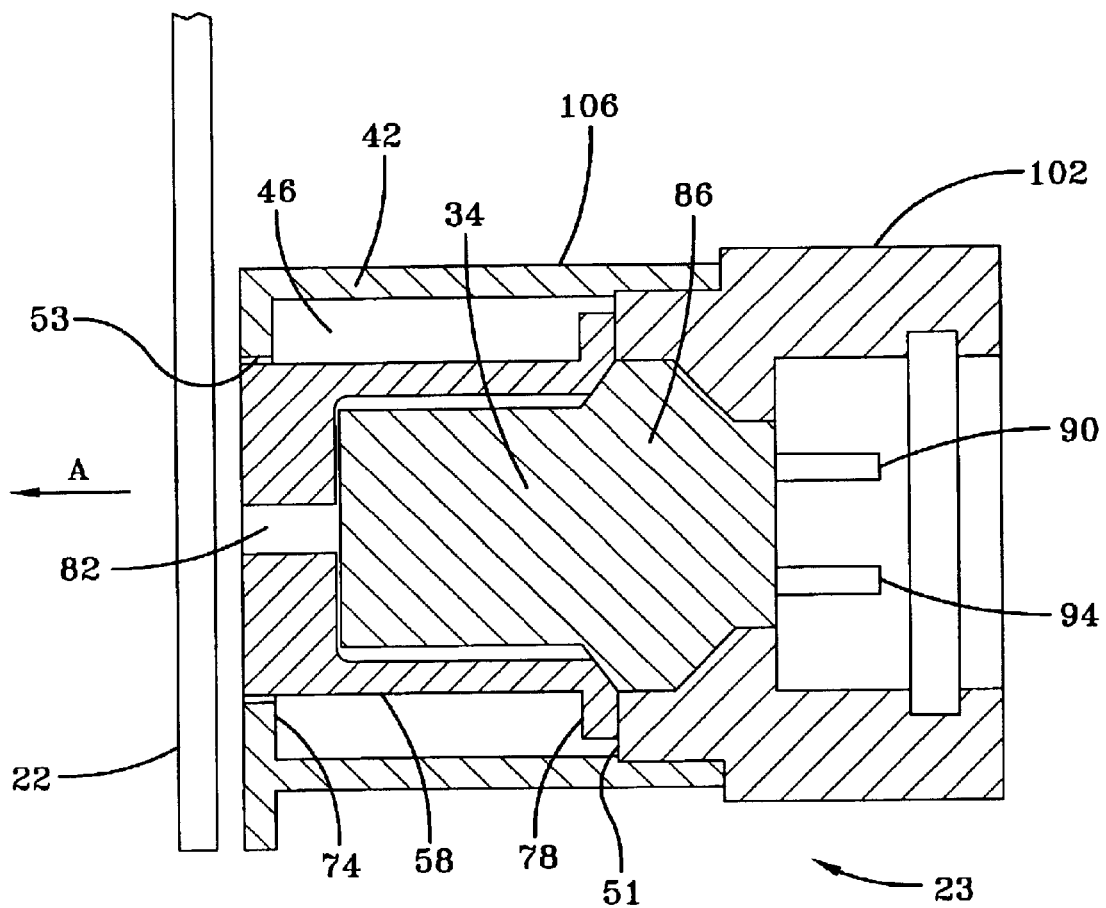
FIG. 4 is a cross-sectional view of actuator in unactuated position, showing propellant housing, piston, and hollow body.
Figure 6:
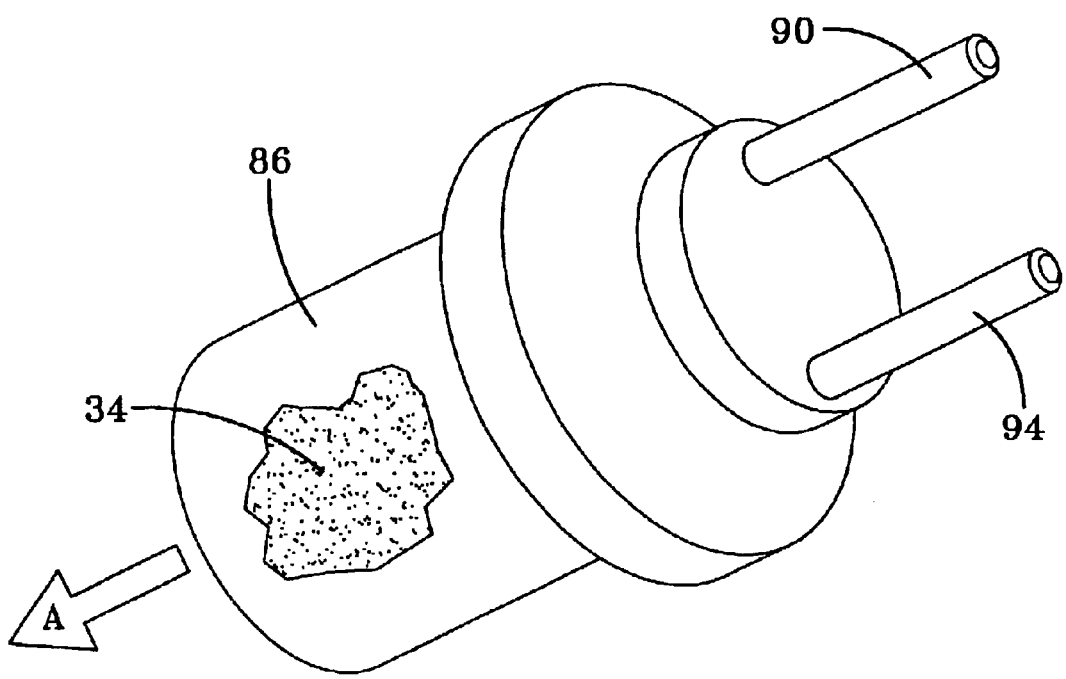
FIG. 6 is a perspective view of propellant housing of FIGS. 4 and 5.

FIG. 4 is a cross-sectional view of actuator 23 relative to flap 22 with actuator 23 unactuated. Here, the propellant 34 is contained within a propellant housing 86 that is a hollow cylinder storing the propellant 34. FIG. 6 is a perspective view of the propellant housing 86. As shown in FIG. 4, the propellant housing 86 is itself supported within a hollow cylinder of a hollow body 42, which has a hollow body interior 46 that is a cylindrical cavity. The hollow body 42 has a first opening 51 and second opening 53 therein. The first opening 51 receives the propellant housing 86 as well as the upper housing 102 while the second opening 53 receives the piston 58.

The actuator 23 employs the hollow body 42 to shield a vehicle occupant from light and particles released by the propellant 34 during actuation of the actuator 23 while still permitting the actuator 23 to move the flap 22 toward the second position 30. The hollow body 42 may comprise an upper housing 102 and a lower housing 106, although the hollow body 42 may be of a single piece design. The propellant housing 86 may be supported within the upper housing 102 by an interference fit. FIG. 4 also shows the piston 58, also a hollow cylinder, resting on top of the propellant housing 86 and disposed within the lower housing 106 of the hollow body 42.

The propellant housing 86 has a first electrical contact 90 and a second electrical contact 94. The electrical contacts 90, 94 are in electrical conductive communication with the propellant 34 or an ignition charge (not shown) in proximity to the propellant 34. To actuate the actuator 23, the control unit 16 sends an electrical signal through a wiring harness 27 to the electrical contacts 90, 94, which ignites the propellant 34 or the ignition charge.

Figure 5:
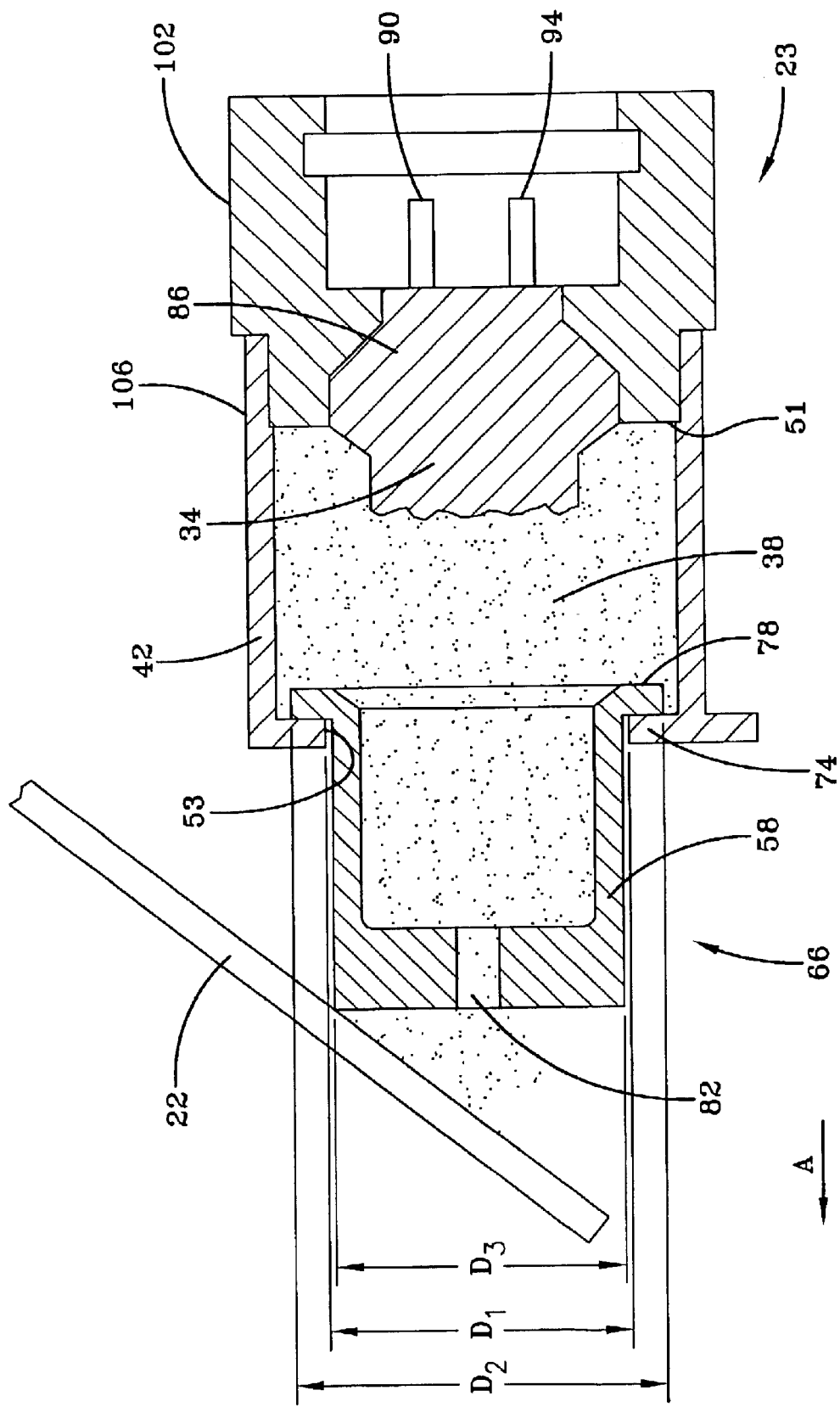
FIG. 5 illustrates the actuator of FIG. 4 in actuated position.

As shown in FIG. 5, when current is passed through the first and second electrical contacts 90, 94 the propellant 34 within propellant housing 86 Ignites, generating gas, light and residual particles within a discharge space 38 of the hollow body interior 46. The propellant housing 86 peels open in this process. Because this reaction occurs within the hollow body interior 46 of the hollow body 42, the hollow body 42 prevents light and particles from escaping in any significant amount into a passenger compartment of a vehicle.

At the same time, without releasing this light and these particles, the actuator 23 can transfer pressure from the gas of propellant 34 to the flap 22. Specifically, a piston 58 is free to slide within the hollow body 42 along the direction indicated by an arrow A. As pressure builds from the expansion of the gas generated by the propellant 34, the piston 58 moves along the direction indicated by the arrow A into the flap 22, imparting momentum to the flap 22 towards a second position 30.

To relieve pressure build-up within the hollow body interior 46, the piston 58 may also be provided with a vent 82, here a hole. The vent 82 is sufficiently small, however, so that insignificant amounts of light and particles from the hollow body 42 exit through the vent. Because of the position of the vent 82 on the piston 58, the flap 22 may further hide light and redirect particles escaping from the vent 82.

In addition to preventing particles and light from escaping into the passenger compartment, the actuator 23 has a feature that retains the piston 58 to the hollow body 42. As shown in FIG. 5, the hollow body 42 has a lip 74 that protrudes circumferentially around the hollow body interior 46 of the hollow body 42 around a second opening 53. The lip 74 provides a stop for a catch 78 of the piston 58 to prevent the piston 58 from ejecting entirely out of the hollow body 42 during actuation. When the actuator 23 is in an actuated position 66, the catch 78 is in contact with the lip 74. The piston 58 and the hollow body 42 are cylindrical. Accordingly, the piston 58 has a first piston diameter D2 and a second piston diameter D3. The second opening 53 has a hollow body diameter D1. The first piston diameter D2 is greater than the hollow body diameter D1 thereby preventing the piston 58 from extending beyond the catch 78. The second piston diameter D3 may pass through the second opening 53 because the second piston diameter D3 is less than the hollow body diameter D1. Thus, during actuation, a portion of the piston 58 is retained within the hollow body 42 while another portion extends through a second opening 53 into contact with the flap 22.

Figure 7:
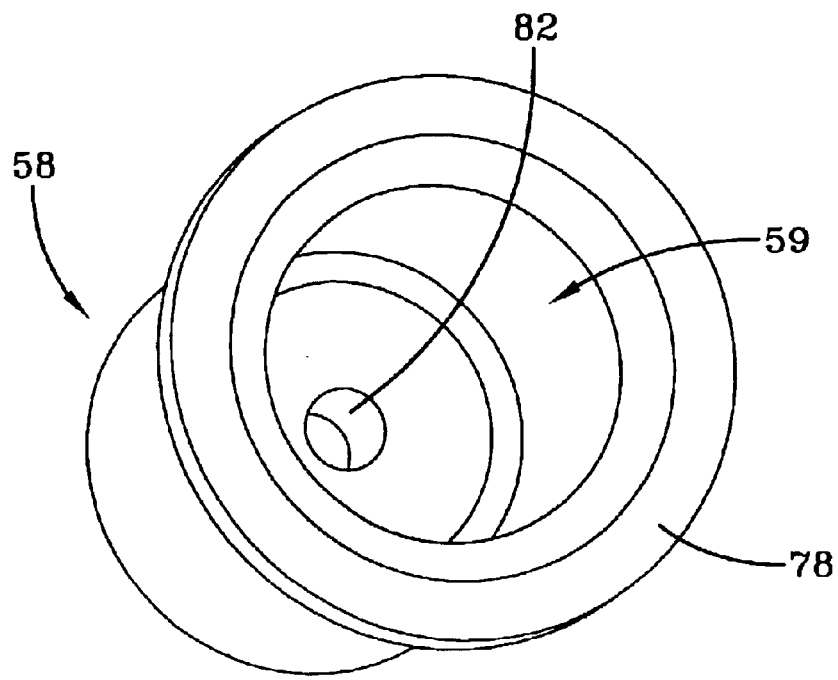
FIG. 7 is a perspective view of piston of FIGS. 4 and 5.

As shown in FIG. 7, the piston 58 has a vent 82, in this example a hole. The piston 58 is generally cylindrical and has a cavity 59 to receive a portion of the propellant housing 86. As shown in FIG. 5, the lip 78 extends circumferentially around a cavity 59 forming a skirt that retains the piston 58 to the hollow body 42 by contact with the lip 74.

Figure 8:
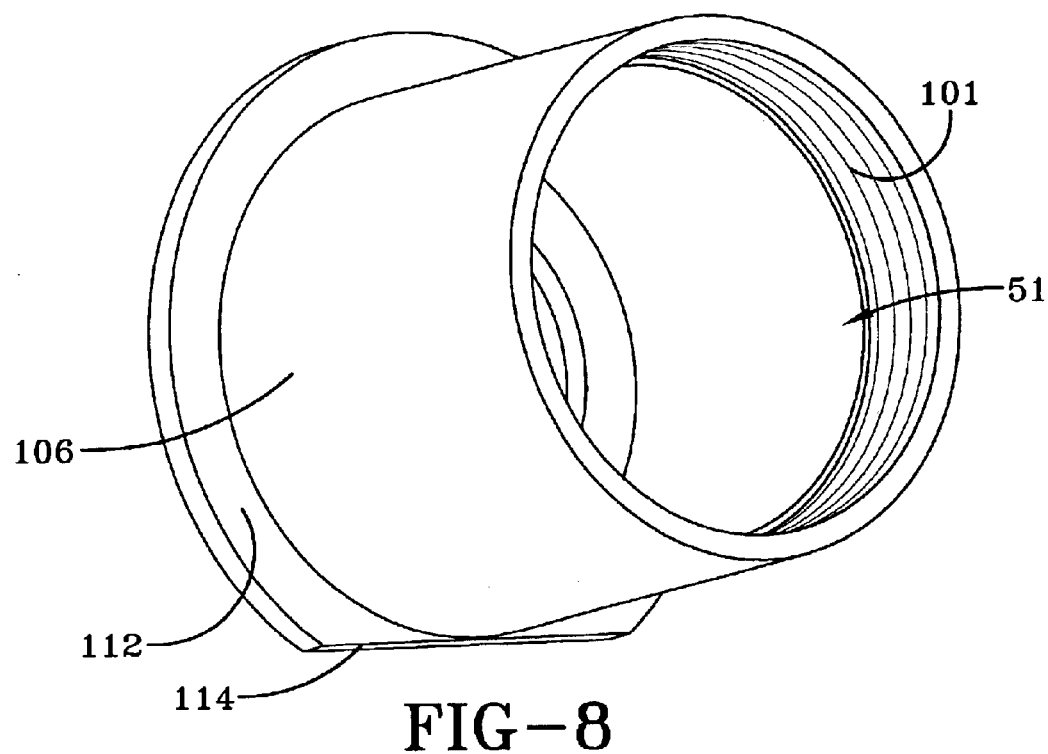
FIG. 8 is a perspective view of lower housing of hollow body of FIGS. 4 and 5.
Figure 9:
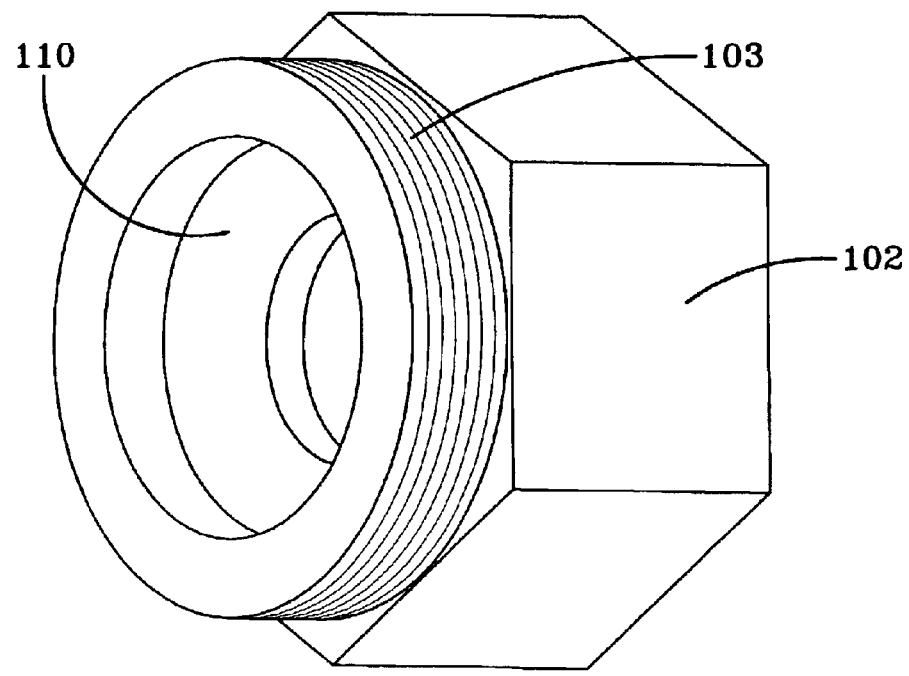
FIG. 9 is a perspective view of upper housing of hollow body of FIGS. 4 and 5.

FIG. 8 is a perspective view of a lower housing 106 of the hollow body 42 while FIG. 9 is a perspective view of an upper housing 102 of the hollow body 42. As shown in these figures and noted previously, the upper housing 102 and lower housing 106 comprise generally cylindrical shapes. The upper housing 102 has a first opening 51 and a second opening 53 therein. The first opening 51 has a threaded portion 101 that receives a threaded portion 103 of the upper housing 102. A flange 112 attaches to the airbag housing 13 and thereby secures the actuator 23 to the airbag housing 13 upon ignition of the propellant 34. In addition, the propellant housing 86 rests on a support surface 110 of the upper housing 102 to also prevent the propellant housing 86 from moving relative to the airbag housing 13. In addition, the flange 112 is provided with a flat surface 114 that is in a specific location relative to the location of the electrical contacts 90, 94 to aid in the orienting of the actuator 23 to the wiring harness 27 connecting the control unit 16 to the actuator 23.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An airbag module comprising:

an airbag inflatable through an opening in the airbag;

an airbag inflator for providing an inflation gas into said opening in the airbag;

an airbag housing to which the airbag inflator and the airbag are attached;

a flap attached to said housing, said flap being movable from a first position permitting inflation gas to flow to said opening in the airbag and a second position deflecting the inflation gas away from said opening in the airbag; and a propellant capable of discharging into a discharge space, said propellant moving said flap between said first position and said second position when discharged;

a hollow body at least partially covering said discharge space, said propellant being stored in said hollow body; and a piston slideably received in said hollow body, said piston having an actuated position following discharge of said propellant into said discharge space and an unactuated position prior to discharge of said propellant into said discharge space, wherein at least a portion or said piston protrudes further outside of said hollow body in said actuated position than in said unactuated position such that at least portion of said piston contacts said flap in said actuated position, and said hollow body has a protrusion in contact with a catch on said piston in said actuated position.

2. The airbag module of claim 1 including a vent in communication with said hollow body.

3. The airbag module of claim 1 including a propellant housing storing said propellant, said propellant housing having a first electrical contact and a second electrical contact in communication with said propellant, said propellant housing received in said hollow body.

4. An airbag module comprising:

an airbag inflatable through an opening in the airbag;

an airbag inflator for providing an inflation gas into said opening in the airbag;

a flap in communication with said airbag inflator, said flap having a first position permitting inflation gas to how to said opening in the airbag and a second position deflecting the inflation gas away from said opening in the airbag;

a propellant capable of discharging into a discharge space, said propellant moving said flap between said first position and said second position when discharged;

a propellant housing storing said propellant, said propellant housing having a first electrical contact and a second electrical contact in communication with said propellant;

a hollow body receiving said propellant housing; and a piston slideably received in said hollow body, said piston having an actuated position following discharge of said propellant into said space and an unactuated position prior to discharge of said propellant into said discharge space, wherein at least a portion of said piston protrudes further outside of said first hollow body in said actuated position than in said unactuated position such that at least portion of said piston contacts said flap in said actuated position, and said hollow body has a lip in contact with a catch on said piston in said actuated position.

5. The airbag module of claim 4 wherein said piston has a venting hole.

6. The airbag module of claim 4 wherein said piston comprises a hollow cylinder, said piston receiving at least a portion of said propellant housing in said unactuated position.

7. The airbag module of claim 6 wherein said hollow body, said piston, and said propellant housing comprise generally cylindrical shapes.

8. The airbag module of claim 7 wherein said hollow body has an opening having a hollow body diameter and said piston has a first piston diameter and a second piston diameter, wherein said first piston diameter is larger than said hollow body diameter and said second piston diameter is smaller than said hollow body diameter.

9. The airbag module of claim 4 wherein said hollow body comprises an upper housing and a lower housing.

10. The airbag module of claim 9 wherein said upper housing has a surface to support said propellant housing.

11. The airbag module of claim 4 including an airbag housing, wherein said hollow body is supported on said airbag housing.

12. The airbag module of claim 4 wherein said hollow body is provided with a flat surface aligned relative to said first electrical contact and said second electrical contact.

* * * * *